US012611774B2

(12) United States Patent
Fu et al.

(10) Patent No.: US 12,611,774 B2
(45) Date of Patent: Apr. 28, 2026

(54) METHOD, APPARATUS, AND STORAGE MEDIUM OF GENERATING DATA SET CONTAINING RGBD IMAGE OF ROBOT HAND AND 3D POSE OF 21 KEY POINTS ON HAND BY GAME ENGINE

(71) Applicant: CLOUDMINDS ROBOTICS CO., LTD., Shanghai (CN)

(72) Inventors: Qiang Fu, Shanghai (CN); Guoguang Du, Shanghai (CN); Shikui Ma, Shanghai (CN); Fei Peng, Shanghai (CN)

(73) Assignee: CHONGQING XINGJIE SHUXING TECHNOLOGY PARTNERSHIP ENTERPRISE (LIMITED PARTNERSHIP), Chongqing (CN)

( * ) Notice: Subject to any disclaimer, the term of this patent is extended or adjusted under 35 U.S.C. 154(b) by 1156 days.

(21) Appl. No.: 17/563,692

(22) Filed: Dec. 28, 2021

(65) Prior Publication Data

US 2022/0126447 A1 Apr. 28, 2022

Related U.S. Application Data

(63) Continuation of application No. PCT/CN2021/119393, filed on Sep. 18, 2021.

(30) Foreign Application Priority Data

Oct. 10, 2020 (CN) .......................... 202011076496.2

(51) Int. Cl.
*G06F 7/48* (2006.01)
*A63F 13/57* (2014.01)
(Continued)

(52) U.S. Cl.
CPC ............. *B25J 9/1671* (2013.01); *A63F 13/57* (2014.09); *B25J 9/1612* (2013.01); *B25J 19/023* (2013.01); *G06T 15/205* (2013.01)

(58) Field of Classification Search
CPC ........ A63F 13/525; A63F 13/57; A63F 13/67; B25J 19/023; B25J 9/1605; B25J 9/1612;
(Continued)

(56) References Cited

U.S. PATENT DOCUMENTS

| 10,796,489 | B1 | 10/2020 | Cordes |
|---|---|---|---|
| 11,030,810 | B1 | 6/2021 | Cordes |
| 2022/0126447 | A1 | 4/2022 | Fu |

FOREIGN PATENT DOCUMENTS

| CN | 108399634 | A | 8/2018 |
|---|---|---|---|
| CN | 111161387 | A | 5/2020 |

(Continued)

OTHER PUBLICATIONS

Liu, Xingyu, et al. "Keypose: Multi-view 3d labeling and keypoint estimation for transparent objects." Proceedings of the IEEE/CVF conference on computer vision and pattern recognition. 2020. (Year: 2020).*

(Continued)

*Primary Examiner* — Nithya J. Moll
(74) *Attorney, Agent, or Firm* — Maschoff Brennan

(57) ABSTRACT

The present disclosure discloses a data generation method and apparatus, and a computer-readable storage medium, the method including: importing a robot model by using a game engine; simulating a Red-Green-Blue Depth (RGBD) camera by a scene capture component in the game engine; controlling a human hand of the imported robot model to move within a field of view of the RGBD camera by using a joint control module in the game engine; acquiring RGBD image data by using the RGBD camera; and generating an
(Continued)

annotated data set with coordinates of 21 key points according to the RGBD image data and coordinate information of a 3D pose of the 21 key points.

10 Claims, 3 Drawing Sheets

(51) Int. Cl.
*B25J 9/16* (2006.01)
*B25J 19/02* (2006.01)
*G06T 15/20* (2011.01)

(58) Field of Classification Search
CPC ......... B25J 9/1671; G05B 2219/37537; G05B 2219/37572; G05B 2219/40309; G06T 15/205; G06V 30/19147
See application file for complete search history.

(56) References Cited

FOREIGN PATENT DOCUMENTS

| | | |
|---|---|---|
| CN | 111368667 A | 7/2020 |
| CN | 111414409 A | 7/2020 |
| CN | 112308910 A | 2/2021 |

OTHER PUBLICATIONS

Zimmermann, Christian, and Thomas Brox. "Learning to estimate 3d hand pose from single rgb images." Proceedings of the IEEE international conference on computer vision. 2017. (Year: 2017).*
International Search Report dated Nov. 25, 2021 as received in application No. PCT/CN2021/119393.
Chinese First Office Action issued in corresponding application No. 202011076496.2, dated Oct. 8, 2022.
Chinese Second Office Action issued in corresponding application No. 202011076496.2, dated Nov. 15, 2022.

* cited by examiner

Robot
model

40

401

402

403

404

405

Annotated
data set

Processor 111

Input apparatus
113

Memory
112

Output apparatus
114

Electronic device 11

METHOD, APPARATUS, AND STORAGE MEDIUM OF GENERATING DATA SET CONTAINING RGBD IMAGE OF ROBOT HAND AND 3D POSE OF 21 KEY POINTS ON HAND BY GAME ENGINE

This application is a continuation of International Application No. PCT/CN2021/119393, filed on Sep. 18, 2021, the disclosure of which is hereby incorporated by reference in its entirety.

FIELD

The present disclosure relates to the technical field of artificial intelligence, and more particularly to a data generation method and apparatus, and a computer-readable storage medium.

BACKGROUND

At present, machine learning and in-depth learning are widely applied in all aspects of society, especially in the field of robots. High-quality data sets allow the algorithm to maximize performance and achieve the best results. However, the generation of data sets is a relatively tedious process. Generally, the number of data sets is relatively large (in the unit of ten thousand), and annotating data sets is relatively tedious. Many data sets still need to be manually annotated. In addition, the acquisition of some data is inconvenient. For example, it is necessary to resort to additional sensors and other devices to acquire some 3D poses in practical situations.

SUMMARY

In order to solve the problem existing in the information interaction between an existing robot device and a user, embodiments of the present disclosure creatively provides a data generation method and apparatus, and a computer-readable storage medium.

According to a first aspect of the present disclosure, a data generation method is creatively provided, the method including: importing a robot model by using a game engine; simulating an RGBD camera by a scene capture component in the game engine; controlling a human hand of the imported robot model to move within a field of view of the RGBD camera by using a joint control module in the game engine; acquiring RGBD image data by using the RGBD camera; and generating an annotated data set with coordinates of 21 key points according to the RGBD image data and coordinate information of a 3D pose of the 21 key points.

According to an embodiment of the present disclosure, the importing a robot model by using a game engine includes: importing every joint of a robot into the game engine in accordance with a joint stacking manner according to a robot 3D model.

According to an embodiment of the present disclosure, simulating an RGBD camera by a scene capture component in the game engine includes: capturing a scene by using a scene capture component to obtain image data; rendering the image data to a texture render target; selecting a capture data source to recombine color image data and depth image data in the image data to obtain recombined image data; and performing channel isolation of color image data and unit unified processing of depth image data of the recombined image data so as to simulate an RGBD camera.

According to an embodiment of the present disclosure, the RGBD image includes a 2D color image and a depth image; and generating an annotated data set with coordinates of 21 key points according to the RGBD image data and coordinate information of a 3D pose of the 21 key points includes: transforming coordinates of the 3D pose of the 21 key points into the 2D color image so as to annotate the 2D color image with the position of every key point; and obtaining depth information of every key point by using the depth image.

According to an embodiment of the present disclosure, prior to transforming coordinates of the 3D pose of the 21 key points into the 2D color image, the method further includes: transforming coordinates of the 3D pose of the 21 key points into coordinates in a coordinate system of the RGBD camera to obtain relative coordinates of the 21 key points; and associating the RGBD image data with the relative coordinates of the 21 key points.

According to a second aspect of the present disclosure, a data generation apparatus is further provided, the apparatus including: a model import module configured to import a robot model by using a game engine; a camera simulation module configured to simulate a RGBD camera by a scene capture component in the game engine; a joint control module configured to control a human hand of the imported robot model to move within a field of view of the RGBD camera; an image acquisition control module configured to acquire RGBD image data by using the RGBD camera; and a data generation module configured to generate an annotated data set with coordinates of 21 key points according to the RGBD image data and coordinate information of a 3D pose of the 21 key points.

According to an embodiment of the present disclosure, the model import module is configured to import every joint of a robot into the game engine in accordance with a joint stacking manner according to a robot 3D model.

According to an embodiment of the present disclosure, the camera simulation module is configured to capture a scene by using a scene capture component to obtain image data; render the image data to a texture render target; select a capture data source to recombine color image data and depth image data in the image data to obtain recombined image data; and perform channel isolation of color image data and unit unified processing of depth image data of the recombined image data so as to simulate an RGBD camera.

According to an embodiment of the present disclosure, the RGBD image includes a 2D color image and a depth image; and the data generation module is configured to transform coordinates of the 3D pose of the 21 key points into the 2D color image so as to annotate the 2D color image with the position of every key point; and obtain depth information of every key point by using the depth image.

According to an embodiment of the present disclosure, the data generation module is further configured to, prior to transforming coordinates of the 3D pose of the 21 key points into the 2D color image, transform the coordinates of the 3D pose of the 21 key points into coordinates in a coordinate system of the RGBD camera to obtain relative coordinates of the 21 key points; and associate the RGBD image data with the relative coordinates of the 21 key points.

According to a third aspect of the present disclosure, a data generation apparatus is also provided, including: one or more processors; a memory configured to store one or more programs which, when executed by the one or more processors, cause the one or more processors to perform any of the data generation methods described above.

According to a fourth aspect of the present disclosure, a computer-readable storage medium is also provided, the storage medium including a set of computer-executable instructions for performing any of the data generation methods described above when the instructions are executed.

In the data generation method and apparatus, and the computer-readable storage medium of the embodiments of the present disclosure, firstly, a game engine is used to import a robot model; then an RGBD camera is simulated by a scene capture component in the game engine; then a human hand of the imported robot model is controlled to move within a field of view of the RGBD camera by using a joint control module in the game engine so as to acquire RGBD image data; and finally, an annotated data set with coordinates of the 21 key points is generated according to the RGBD image data and coordinate information of a 3D pose of the 21 key points. In this way, according to the present disclosure, a data set containing an RGBD image of a robot hand and a 3D pose of 21 key points on the hand which is difficult to provide in an actual scene is generated by a game engine, and the data set with the coordinates of the 21 key points may be generated very quickly and accurately, while the generated data set has already been annotated. Thus, a data set including tens of thousands of images, which would otherwise take days or even weeks to generate, may be completed in half a day, greatly improving efficiency. In addition, the generated simulation data set may be used to verify the performance of the learning algorithm, and the high degree of restoration modeling of the game engine also makes the data set generated in the simulation have application value in the actual scene.

It is to be understood that the teachings of the present disclosure do not necessarily achieve all of the benefits described above, that particular embodiments may achieve particular benefits, and that other embodiments of the present disclosure may also achieve benefits not described above.

BRIEF DESCRIPTION OF THE DRAWINGS

The foregoing and other objects, features and advantages of exemplary embodiments of the present disclosure will become readily apparent from the following detailed description when read in connection with the drawings. Embodiments of the present disclosure are illustrated by way of example, and not by way of limitation, in the figures of the drawings and in which.

In the drawings, the same or corresponding reference numerals designate the same or corresponding parts.

DETAILED DESCRIPTION OF EXAMPLE EMBODIMENTS

Figure 1:
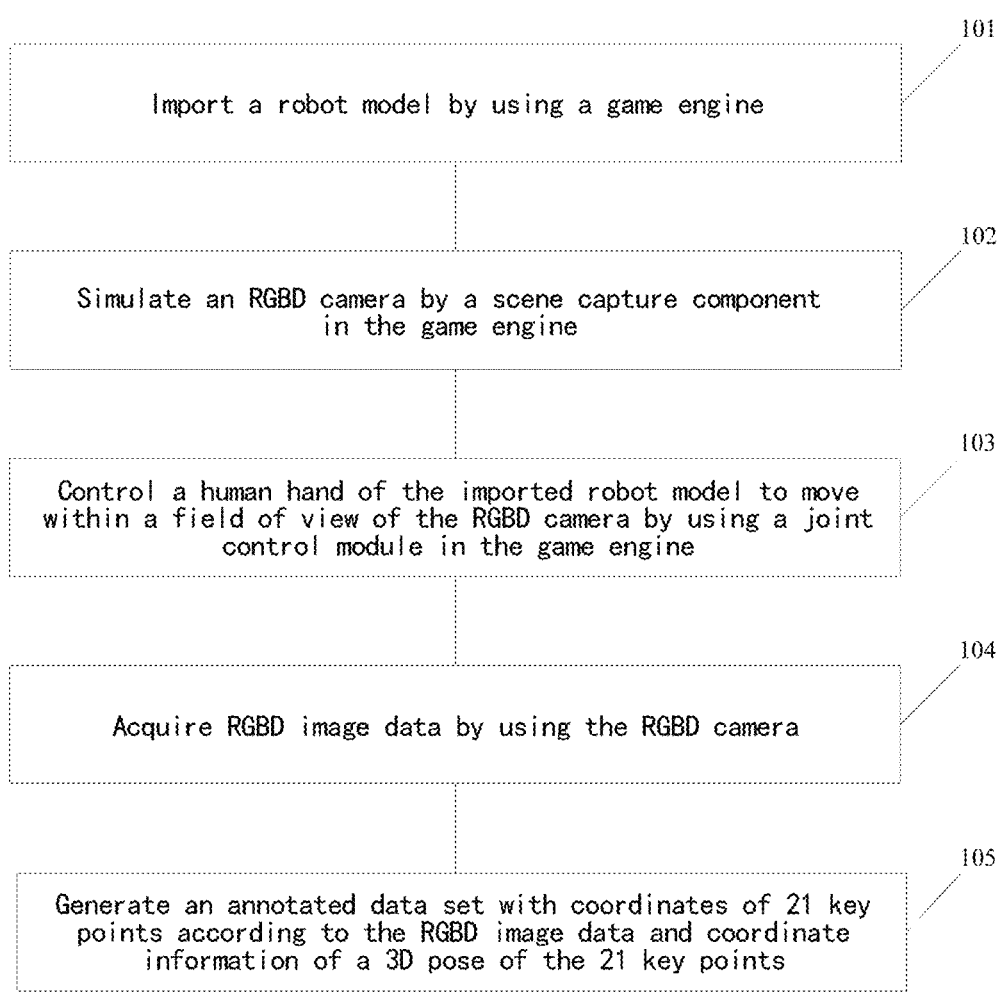
FIG. 1 shows a flowchart illustrating the implementation of a data generation method according to an embodiment of the present disclosure.

In order that the objects, features and advantages of the present disclosure may be more fully apparent and appreciated, reference will now be made in detail to the embodiments of the present disclosure, and examples of which are illustrated in the drawings. It is to be understood that the described embodiments are merely illustrative and not restrictive of the embodiments of the present disclosure. Based on the embodiments in the present disclosure, all the other embodiments obtained by persons skilled in the art without making any inventive effort fall within the scope of protection of the present disclosure.

Reference in the specification to "one embodiment", "some embodiments", "an example", "a specific example", or "some examples", etc. means that a particular feature, structure, material, or characteristic described in connection with the embodiment or example is included in at least one embodiment or example of the present disclosure. In addition, the particular features, structures, materials, or characteristics described may be combined in any suitable manner in any one or more embodiments or examples. Furthermore, combinations and integration of the various embodiments or examples and features of the various embodiments or examples described in this specification can be made by those skilled in the art without departing from the scope of the invention.

Furthermore, the terms "first" and "second" are used for descriptive purposes only and are not to be construed as indicating or implying relative importance or as implicitly indicating the number of technical features indicated. Thus, a feature defined as "first" or "second" may explicitly or implicitly includes at least one of the features. In the description of the present disclosure, the meaning of "a plurality" is two or more, unless specifically and specifically limited otherwise.

Figure 2:
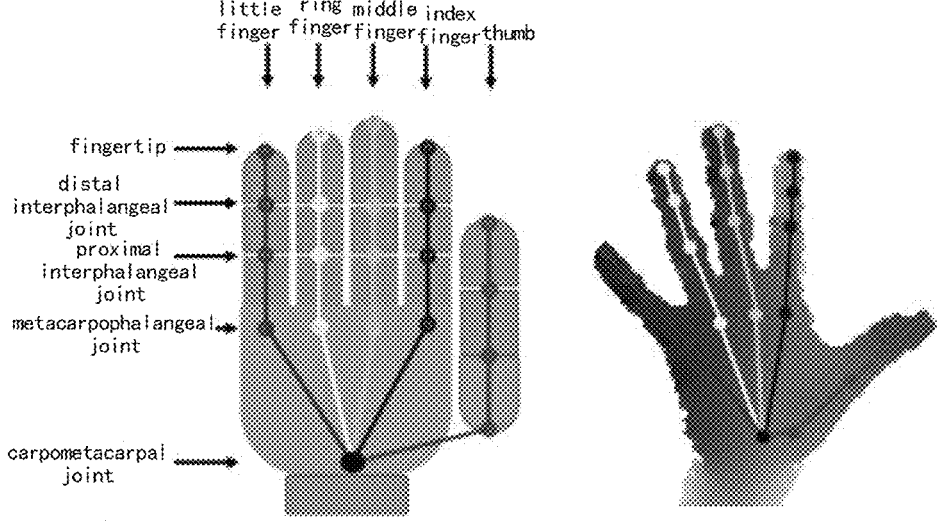
FIG. 2 shows a display effect diagram of positions of 21 key points according to an application example of the present disclosure.
Figure 3:
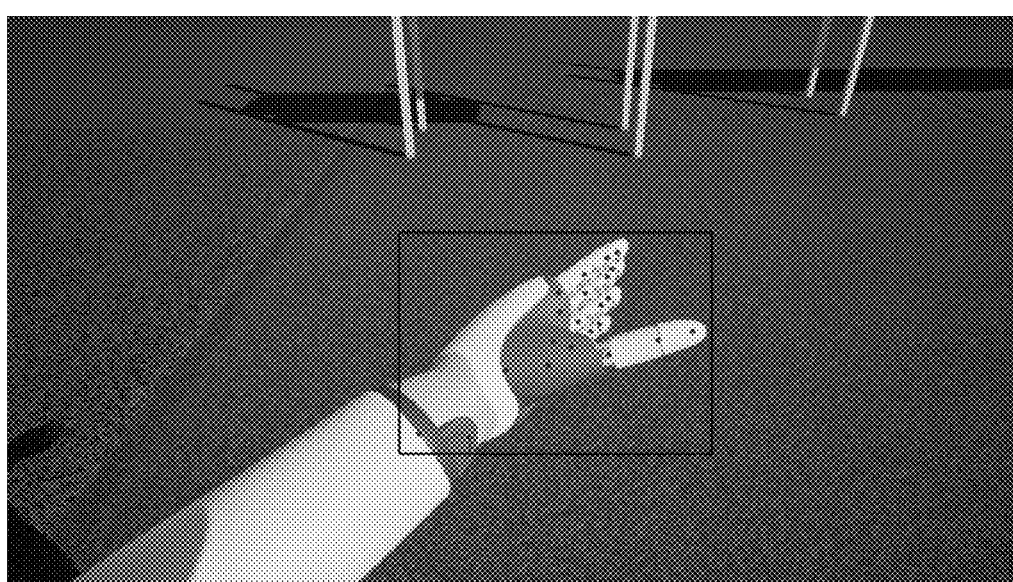
FIG. 3 shows a scene effect diagram of annotated data generated according to an application example of the present disclosure.

FIG. 1 shows a flowchart illustrating the implementation of a data generation method according to an embodiment of the present disclosure; FIG. 2 shows a display effect diagram of positions of 21 key points according to an application example of the present disclosure; and FIG. 3 shows a scene effect diagram of annotated data generated according to an application example of the present disclosure.

With reference to FIG. 1, an embodiment of the present disclosure provides a data generation method, including the following steps:

In step 101, a robot model is imported by using a game engine.

In particular, the electronic device imports the robot model by using a game engine (Unreal Engine 4, UE4). The UE4 game engine may guarantee a high degree of restoration of the imported robot model and the real robot.

Here, the electronic device may be any form of intelligent device equipped with a game engine.

In step 102, an RGBD camera is simulated by a scene capture component in the game engine.

In particular, the electronic device captures a scene by using the scene capture component to obtain image data; the image data is rendered to a texture render target; color image data and depth image data in the image data are recombined to obtain recombined image data by selecting a capture data source; and channel isolation of color image data and unit unified processing of depth image data of the recombined image data are performed so as to simulate an RGBD camera.

In an application example, the electronic device is provided with a customed camera module which is developed by using a scene capture component (SceneCaptureComponent 2D) in the UE4 game engine. The SceneCaptureComponent 2D may capture and render a scene to a texture render target (TextureRenderTarget 2D), select an appropriate capture data source (CaptureSource) and reorganize the color and depth data so that both color and depth image data may be acquired simultaneously by using the same scene capture component. Then, after reading the image data from the rendered object, channel isolation of the color image and unit unification of the depth image are performed, and standard RGBD data can be obtained. The camera simulation module is particularly simple in application, and can be directly bound to an actor as an internal component to send out an RGBD image in real time as an actual camera does; meanwhile, the camera simulation module supports modifying the internal parameters of the camera, and can ensure that the generated image is consistent with that generated by an actual camera.

Thus, the electronic device simulates an RGBD camera by the scene capture component in the game engine. In the RGBD camera model process, the internal parameter matrix of the real camera is used, so that the simulation data and the image data of the real camera may be consistent.

In step 103, a human hand of the imported robot model is controlled to move within a field of view of the RGBD camera by using a joint control module in the game engine.

In particular, the electronic device may utilize a joint control module in the game engine to control a human hand, such as a left hand or a right hand, of the imported robot model to make random motions within the field of view of the RGBD camera for acquiring a large number of available data images.

In step 104, RGBD image data is obtained by using the RGBD camera.

Among others, the RGBD image includes a 2D color image and a depth image.

In step 105, an annotated data set with coordinates of 21 key points is generated according to the RGBD image data and coordinate information of a 3D pose of the 21 key points.

In particular, the electronic device transforms coordinates of the 3D pose of the 21 key points into the 2D color image to annotate the 2D color image with the position of every key point; and obtain depth information of every key point by using the depth image.

Certainly, prior to step 105, the electronic device would obtain coordinate information of the 3D pose of the 21 key points via the game engine; transform coordinates of the 3D pose of the 21 key points into coordinates in a coordinate system of the RGBD camera to obtain relative coordinates of the 21 key points; and associate the RGBD image data with the relative coordinates of the 21 key points.

In an application example, with reference to the positions of the 21 key points on the left hand of the robot model shown in FIG. 2, every position is bound with an empty character, and the game engine may obtain coordinate information of every empty character in real time. Then, a blueprint is written in the UE4, and the coordinates of the 3D pose of the 21 key points are transformed into coordinates in a coordinate system of the RGBD camera, and stored in a file in a certain order. The acquired RGBD image data is associated with the obtained relative coordinates of the 21 key points, and the 3D coordinates of the 21 key points are transformed into a 2D color image by using the internal parameter matrix of the camera to annotate the 2D image with the position of every key point, thereby determining the range of the hand in the image, and achieve the purpose of annotation. As shown in the following FIG. 3, in the annotated image, the range of the hand is completely enclosed by an annotation frame with a specific color, and depth information of every key point is obtained by using the depth image.

In the data generation method of the embodiment of the present disclosure, firstly, a robot model is imported by using a game engine; then an RGBD camera is stimulated by a scene capture component in the game engine; then a human hand of the imported robot model is controlled to move within a field of view of the RGBD camera by using a joint control module in the game engine so as to obtain RGBD image data; finally, an annotated data set with coordinates of 21 key points is generated according to the RGBD image data and coordinate information of a 3D pose of the 21 key points. In this way, according to the present disclosure, a data set containing an RGBD image of a robot hand and a 3D pose of 21 key points on the hand which is difficult to provide in an actual scene is generated by a game engine, and the data set with the coordinates of the 21 key points can be generated very quickly and accurately, while the generated data set has already been annotated. Thus, a data set including tens of thousands of images, which would otherwise take days or even weeks to generate, can be completed in half a day, greatly improving efficiency. In addition, the generated simulation data set can be used to verify the performance of the learning algorithm, and the high degree of restoration modeling of the game engine also makes the data set generated in the simulation have application value in the actual scene.

Figure 4:
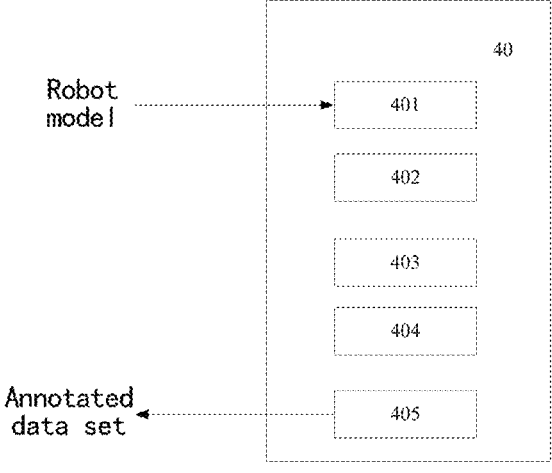
FIG. 4 shows a schematic diagram illustrating a composition structure of a data generation apparatus according to an embodiment of the present disclosure.

FIG. 4 shows a schematic diagram illustrating the composition structure of a data generation apparatus according to an embodiment of the present disclosure.

Referring to FIG. 4, a data generation apparatus 40 according to an embodiment of the present disclosure includes: a model import module 401 configured to import a robot model by using a game engine; a camera simulation module 402 configured to simulate an RGBD camera by a scene capture component in the game engine; a joint control module 403 configured to control a human hand of the imported robot model to move within a field of view of the RGBD camera; an image acquisition control module 404 configured to acquire RGBD image data by using the RGBD camera; and a data generation module 405 configured to generate an annotated data set with coordinates of 21 key points according to the RGBD image data and coordinate information of a 3D pose of the 21 key points.

In an embodiment, the model import module 401 is configured to import every joint of a robot into the game engine in a joint stacking manner according to a 3D model of the robot.

In an embodiment, the camera simulation module 402 is configured to capture a scene by using a scene capture component to obtain image data; render the image data to a texture render target; select a capture data source to recombine color image data and depth image data in the image data to obtain recombined image data; and perform channel isolation of color image data and unit unified processing of depth image data of the recombined image data so as to simulate an RGBD camera.

In an embodiment, the RGBD image includes a 2D color image and a depth image; and the data generation module 405 is configured to transform coordinates of the 3D pose of the 21 key points into the 2D color image to annotate the 2D color image with the position of every key point; and obtain depth information of every key point by using the depth image.

In an embodiment, the data generation module 405 is further configured to, prior to transforming coordinates of the 3D pose of the 21 key points into the 2D color image, transform the coordinates of the 3D pose of the 21 key points into coordinates in a coordinate system of the RGBD camera to obtain relative coordinates of the 21 key points; and associate the RGBD image data with the relative coordinates of the 21 key points.

Figure 5:
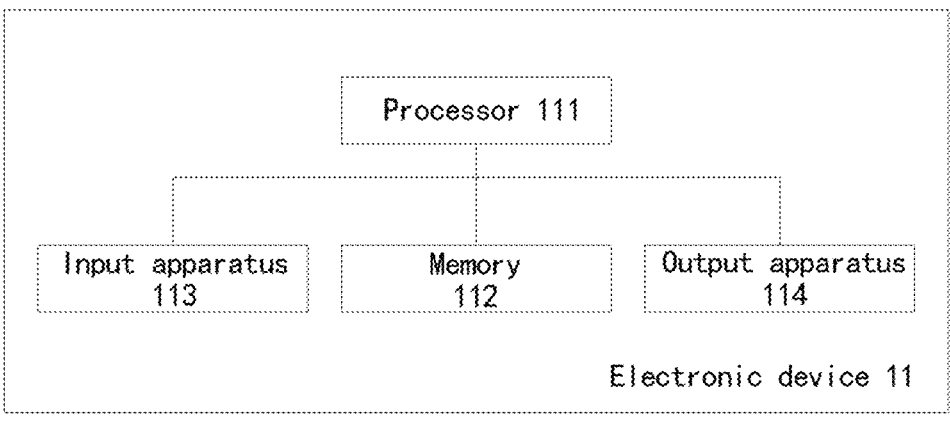
FIG. 5 shows a schematic diagram illustrating a composition structure of an electronic device provided according to an embodiment of the present disclosure.

FIG. 5 shows a block diagram of an electronic device according to an embodiment of the present disclosure.

As shown in FIG. 5, the electronic device 11 includes one or more processors 111 and a memory 112.

The processor 111 may be a central processing unit (CPU) or other form of processing unit with data processing and/or instruction execution capabilities, and may control other components in the electronic device 11 to perform desired functions.

The memory 112 may include one or more computer program products that may include various forms of computer-readable storage media, such as a volatile memory and/or a non-volatile memory. The volatile memory may include, for example, a random access memory (RAM) and/or a cache, etc. The non-volatile memory may include, for example, a read only memory (ROM), a hard disk, a flash memory, etc. One or more computer program instructions may be stored on the computer-readable storage medium, and the processor 111 may execute the program instructions to implement the control methods supporting dynamic intentions and/or other desired functionality of the various embodiments of the present disclosure described above. Various contents such as an input signal, a signal component, a noise component, etc. may also be stored in the computer readable storage medium.

In an example, the electronic device 11 may further include: an input apparatus 113 and an output apparatus 114 interconnected by a bus system and/or other form of connection mechanism (not shown).

For example, when the electronic device is a control apparatus 60 supporting dynamic intentions, the input apparatus 113 may be a microphone or a microphone array as described above, configured to capture an input signal of a sound source. When the electronic device is a stand-alone apparatus, the input apparatus 113 may be a communication network connector configured to receive the collected input signal from a data generation apparatus 40.

Furthermore, the input apparatus 13 may include, for example, a keyboard, a mouse, etc.

The output apparatus 114 may output various information to the outside, including information of determined distance, information of directions, etc. The output apparatus 114 may include, for example, a display, a speaker, a printer, and a communication network and remote output apparatuses connected thereto.

Certainly, only some of the components of the electronic device 11 related to the present disclosure are shown in FIG. 5 for simplicity, omitting components such as buses, input/output interfaces, etc. In addition, the electronic device 11 may include any other suitable components depending on the particular application.

In addition to the methods and apparatuses described above, embodiments of the present disclosure may also be a computer program product including computer program instructions that, when executed by a processor, cause the processor to perform steps in a method of training a multi-task model according to various embodiments of the present disclosure as described in the "Exemplary Methods" section of the present specification above.

The computer program product may write program code for performing operations of embodiments of the present disclosure in any combination of one or more programming languages, including object-oriented programming languages such as Java, C++, etc. and conventional procedural programming languages, such as the "C" language or similar programming languages. The program code may execute entirely on the user computing apparatus, partly on the user apparatus, as a stand-alone software package, partly on the user computing apparatus, partly on a remote computing apparatus, or entirely on the remote computing apparatus or server.

Furthermore, embodiments of the present disclosure may also be a computer-readable storage medium having stored thereon computer program instructions which, when executed by a processor, cause the processor to perform steps in a method of training a multi-task model according to various embodiments of the present disclosure as described in the "Exemplary Methods" section above of this specification.

The computer-readable storage medium may take any combination of one or more readable media. The readable medium may be a readable signal medium or a readable storage medium. The readable storage medium can include, for example, but not limited to, an electronic, magnetic, optical, electromagnetic, infrared, or semiconductor system, apparatus, or apparatus, or a combination of any of the above. More specific examples (a non-exhaustive list) of readable storage media include: an electrical connection having one or more wires, a portable disk, a hard disk, a random access memory (RAM), a read-only memory (ROM), an erasable programmable read-only memory (EPROM or Flash memory), an optical fiber, a portable compact disk read-only memory (CD-ROM), an optical storage apparatus, a magnetic storage apparatus, or any suitable combination of the above.

While the general principles of the disclosure have been described above in connection with specific embodiments, it is to be noted that the advantages, strengths, effects, and the like set forth in this disclosure are merely exemplary and not limiting, and are not to be construed as necessarily required by the various embodiments of the disclosure. Furthermore, the particular details disclosed above are for purposes of example and explanation only and are not intended to be limiting, as the disclosure is not intended to be limited to the particular details disclosed above.

The block diagrams of apparatuses, apparatuses, equipment, systems referred to in this disclosure are merely illustrative examples and are not intended to require or imply that a connection, arrangement, configuration must be made in the manner shown in the block diagrams. The apparatuses, apparatus, equipment, systems may be connected, arranged, configured in any manner, as will be appreciated by those skilled in the art. Words such as "including", "comprising", "having", and the like are open-ended terms that mean "including, but not limited to", and are used interchangeably therewith. The words "or" and "and" as used herein refer to the word "and/or" and may be used interchangeably therewith unless the context clearly dictates otherwise. As used herein, the word "such as" means the phrase "such as, but not limited to", and is used interchangeably therewith.

It is also noted that the components or steps may be disassembled and/or recombined in the apparatus, apparatus and method of the present disclosure. Such decomposition and/or recombination should be considered as equivalents of the present disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

The foregoing description has been presented for purposes of illustration and description. Moreover, this description is not intended to limit the embodiments of the disclosure to the form disclosed herein. While a number of aspects of example and embodiments have been discussed above, those of skill in the art will recognize certain variations, modifications, changes, additions and sub-combinations thereof.

What is claimed is:

1. A data generation method, comprising:
importing a robot model by using a game engine;
simulating an RGBD (Red, Green, Blue, Depth) camera by a scene capture component in the game engine;
controlling a human hand of the imported robot model to move within a field of view of the RGBD camera by using a joint control module in the game engine;
acquiring RGBD image data by using the RGBD camera; and
generating an annotated data set with coordinate of a key point according to the RGBD image data and coordinate information of a 3D pose of the key point;
wherein the simulating the RGBD camera by a scene capture component in the game engine comprises:
capturing a scene by using the scene capture component to obtain image data;
rendering the image data to a texture render target;
selecting a capture data source to recombine color image data and depth image data in the image data to obtain recombined image data; and
performing channel isolation of the color image data and unit unified processing of depth image data on the recombined image data so as to simulate the RGBD camera.

2. The method according to claim 1, wherein the importing a robot model by using a game engine comprises:
importing every joint of a robot into the game engine in accordance with a joint stacking manner according to a robot 3D model.

3. The method according to claim 1, wherein the RGBD image comprises a 2D color image and a depth image; and the generating an annotated data set with coordinates of 21 key points according to the RGBD image data and coordinate information of a 3D pose of the 21 key points, comprises:
transforming the coordinates of the 3D pose of the 21 key points into the 2D color image so as to annotate the 2D color image with a position of every key point; and
obtaining depth information of every key point by using the depth image.

4. The method according to claim 3, wherein prior to the transforming coordinates of the 3D pose of the 21 key points into the 2D color image, the method further comprises:
transforming the coordinates of the 3D pose of the 21 key points into coordinates in a coordinate system of the RGBD camera to obtain relative coordinates of the 21 key points; and
associating the RGBD image data with the relative coordinates of the 21 key points.

5. A data generation apparatus, comprising: one or more processors; a memory configured to store one or more programs which, when executed by the one or more processors, cause the one or more processors to perform the data generation method of claim 1.

6. A computer-readable non-transitory storage medium, comprising a set of computer-executable instructions for performing the data generation method of claim 1 when the instructions are executed.

7. The method according to claim 1, wherein the key point comprises 21 key points, and the annotated data set with coordinate of a key point comprises annotated data set with coordinates of 21 key points.

8. A data generation apparatus, comprising:
a model import module configured to import a robot model by using a game engine;
a camera simulation module configured to simulate an RGBD (Red, Green, Blue, Depth) camera by a scene capture component in the game engine;
a joint control module configured to control a human hand of the imported robot model to move within a field of view of the RGBD camera;
an image acquisition control module configured to acquire RGBD image data using the RGBD camera; and
a data generation module configured to generate an annotated data set with coordinate of a key point according to the RGBD image data and coordinate information of the 3D pose of the key point;
the camera simulation module is configured to capture a scene by using the scene capture component to obtain image data; render the image data to a texture render target; select a capture data source to recombine color image data and depth image data in the image data to obtain recombined image data; and perform channel isolation of color image data and unit unified processing of depth image data of the recombined image data so as to simulate an RGBD camera.

9. The apparatus according to claim 8, wherein
the model import module is configured to import every joint of a robot into the game engine in accordance with a joint stacking manner according to a robot 3D model.

10. The apparatus according to claim 8, wherein the key point comprises 21 key points, and the annotated data set with coordinate of a key point comprises annotated data set with coordinates of 21 key points.

* * * * *